(12) United States Patent
Stanovskoy et al.

(10) Patent No.: US 8,789,437 B2
(45) Date of Patent: Jul. 29, 2014

(54) ECCENTRICALLY CYCLOIDAL ENGAGEMENT OF TOOTHED PROFILES HAVING CURVED TEETH

(75) Inventors: Viktor Vladimirovich Stanovskoy, Tomsk (RU); Sergey Matveevich Kazakyavichyus, Tomsk (RU); Tatiana Andreevna Remneva, Tomsk (RU); Vladimir Mikhajlovich Kuznetsov, Tomsk (RU); Alexandr Viktorovich Stanovskoy, Tomsk (RU)

(73) Assignee: Closed Joint Stock Company "Technology Market", Tomsk (RU)

( * ) Notice: Subject to any disclaimer, the term of this patent is extended or adjusted under 35 U.S.C. 154(b) by 0 days.

(21) Appl. No.: 13/562,777

(22) Filed: Jul. 31, 2012

(65) Prior Publication Data

US 2012/0291578 A1  Nov. 22, 2012

Related U.S. Application Data

(63) Continuation of application No. PCT/RU2011/000027, filed on Jan. 21, 2011.

(30) Foreign Application Priority Data

Feb. 1, 2010  (RU) ................................ 2010103286

(51) Int. Cl.
F16H 55/08  (2006.01)
(52) U.S. Cl.
USPC .............................................. 74/462; 74/458
(58) Field of Classification Search
USPC .................. 74/424.5, 458, 460, 462
See application file for complete search history.

(56) References Cited

U.S. PATENT DOCUMENTS

| | | | | |
|---|---|---|---|---|
| 2,462,924 A | * | 3/1949 | Ungar | 74/466 |
| 4,140,445 A | * | 2/1979 | Schibbye | 418/201.3 |
| 4,329,130 A | * | 5/1982 | Nagata et al. | 418/150 |
| 4,858,487 A | | 8/1989 | Mercier | |
| 4,922,781 A | * | 5/1990 | Peiji | 74/462 |
| 6,000,920 A | * | 12/1999 | Yoshimura | 418/201.3 |

FOREIGN PATENT DOCUMENTS

| | | |
|---|---|---|
| CH | 657434 A5 | 8/1986 |
| RU | 2338105 C1 | 11/2008 |
| SU | 1060835 A | 12/1983 |

OTHER PUBLICATIONS

International Search Report for PCT/RU2011/000027 filed on Jan. 21, 2011, mailed on Jun. 9, 2011.
Kraynev, "Reference Dictionary on Mechanisms", Mashinostroyeniye, 1987, pp. 166, 242, Moscow.
Stanovskoy et al. "New Gearing with Spiral Teeth", Reference book. Engineering journal, 2008, No. 9, pp. 34-39.

* cited by examiner

*Primary Examiner* — William C Joyce
(74) *Attorney, Agent, or Firm* — Patentbar International, P.C.

(57) ABSTRACT

An eccentrically cycloidal gear engagement of tooth profiles having curvilinear teeth is disclosed. One of the engaging profiles represents a gearwheel with at least two helical teeth. The flanks of each tooth of the first tooth profile are outlined, in a principal cross-section of the gearwheel, by corresponding arcs of circular curves, eccentrically shifted from a center of rotation of the gearwheel. The second tooth profile, which is conjugated with the first tooth profile, has helical cycloidal teeth. The teeth of the second tooth profile are outlined, in the same cross-section, by segments of front edges of intersecting cycloidal curves. Tips and troughs between teeth can have any shape, not intersecting with the gearwheel teeth.

2 Claims, 13 Drawing Sheets

ECCENTRICALLY CYCLOIDAL ENGAGEMENT OF TOOTHED PROFILES HAVING CURVED TEETH

RELATED APPLICATIONS

This application is a Continuation of PCT application serial number PCT/RU2011/000027 filed on Jan. 21, 2011, which claims priority to Russian Patent Application No. 2010103286 filed on Feb. 1, 2010, both of which are incorporated herein by reference in their entirety.

BACKGROUND OF THE INVENTION

The invention relates to mechanical transmissions for transforming the rotational motion to the rotational or reciprocal one, applying the toothed engagement of gears and it can find its application in cylindrical, bevel or planetary gearboxes and rack gears with a high gear ratio, small overall dimensions and a high load carrying capacity.

Along with all its advantages, the commonly used involute gearing possesses the low load carrying capacity, determined by tooth dimensions and, moreover, it has restrictions of the gear ratio in one stage. In practice the gear ratio of a single-stage gearbox seldom exceeds 7. In order to increase the involute gearing load carrying capacity, the tooth module is to be increased, leading to the unreasonable increase of gear dimensions.

The helical Novikov gearing is known (A. F. Kraynev. Reference dictionary on mechanisms, Moscow, Mashinostroyeniye, 1987, p. 242). Its toothed profiles have the contact point, transferring in operation along the line, parallel to gearwheels axes. The gearwheels convex flanks of pitch addendums are interacting with concave flanks of pitch dedendums. For this purpose the profiles are outlined in the end cross-section by circumference arcs with curvatures of opposite signs. The gearing transverse contact ratio is equal or close to zero. Operating smoothness is achieved by the axial overlap, its coefficient being chosen above 1. In comparison with the involute gearing, the Novikov one has twice higher load carrying capacity and possesses the increased efficiency, but unlike the involute one, it is very sensitive to variation of interaxial distance. That is why a higher manufacturing accuracy and increased rigidity of shafts and supports are required here.

The eccentrically cycloidal gearing with curvilinear tooth profiles is known (see Stanovskoy V. V., Kazakyavichyus S. M. et al. New type of gearing with curvilinear toothed profiles. Reference book. Engineering journal, No 9, 2008, pp. 34-39). Its smaller gearwheel has only one helical tooth with the profile in the end cross-section representing the circumference, eccentrically shifted with respect to the gearwheel axis of rotation. The curvilinear helical profile of the gearwheel is generated by a consequent continuous displacement of this circumference along the gearwheel axis with its simultaneous rotation around the same axis. The greater gearwheel tooth profile in the end section is conjugated with the eccentrically shifted circumference of the smaller gearwheel. The profile is plotted as the envelope of the eccentric circumferences family in different meshing phases and it represents the cycloidal curve which is the equidistant of an epitrochoid for the external gearing. The helical curvilinear flank of the second gearwheel teeth is generated similarly by a consequent continuous rotation of cycloidal end sections around the gearwheel axis. The gearing can be applied in cylindrical or bevel gearwheels and in a rack gear. In case of bevel gearwheels engagement the teeth will have the described above shape in sections by an additional cone or in spherical sections with the sphere center in the point of gearwheels axes intersection. The section by an additional cone for bevel gearwheels and the end section for cylindrical gearwheels can be defined by one generalized concept—the principal cross-section.

SUMMARY OF THE INVENTION

Gearwheel tooth profiles are conjugated in each end section and they have many contact points simultaneously. These points generate the continuous helical contact line. In any end section of the engagement the force contact of profiles will be implemented at the area, less than a half of the helical eccentric revolution. Therefore, the transverse contact ratio is less than or equal to ½ and in order to provide the smooth operation of the gear, the axial overlap ratio is chosen greater than ½. These values are true for an ideal gearing. In practice the axial overlap ratio is chosen equal to or greater than 1 because of manufacturing errors and the angle of axial overlap constitutes 360 degrees. The gearing possesses a high gear ratio, a high efficiency and load carrying capacity. The gearing is less sensitive to interaxial distance variation, than even the involute one, since it has greater tooth height for the same gear ratio and overall dimensions.

Since the gearing is helical, it has restrictions of a maximum tooth inclination angle, determined by a standard GOST as 45 degrees. In order to obtain the axial overlap angle equal to 360 degrees for such an inclination angle, it is necessary to increase the gear overall dimensions, which is not always admissible. The pointed gearing is chosen as the prototype.

Therefore, the task of invention is the development of a small sized gear with the high load carrying capacity and efficiency, and the low sensitivity to center distance inaccuracies.

The technical result is the decrease of the axial overlap angle and axial dimensions of the gearing.

The additional technical result, achieved in certain gearing versions, is the decrease of the area of a precise machining.

In order to achieve the pointed result in the eccentrically cycloidal gearing with curvilinear tooth profiles, one of the profiles represents the gearwheel with at least two helical teeth. Operating flanks of each tooth of this gearwheel are outlined in any principal cross-section by arcs of the eccentrically shifted circumference. The second profile tooth flank is outlined in the same principal cross-section by segments of cycloidal curves front edges, conjugated with the first profile gearwheel teeth. Tips and troughs between teeth of both profiles can have any shape with the only condition of their non-intersection in operation.

In particular, the first profile helical teeth in the principal cross-section can be outlined by eccentrically shifted circumferences. Then the second profile teeth in the same principal cross-section will be outlined by segments of intersecting cycloidal curves, conjugated with the first gearwheel teeth. It should be noted, that the gearing with its teeth fully outlined by arcs of the eccentric circumference and intersecting cycloidal curves requires much greater machining time, because the area of a surface with a complicated geometrical shape is considerably increased.

The pointed gearing can be implemented in various types of gearing (external and internal), in various gearwheel shapes (cylindrical and bevel) and also as the rack gearing.

As for the cylindrical gearing, the principal cross-sections of gearwheels are their end sections. As for the rack gearing, the principal cross-section is the section by the plane, perpendicular to the gearwheel axis and parallel to the rack. As for the bevel gearing, the principal cross-sections of gearwheels are sections by an additional cone.

Another gearing modification is also possible for the bevel gearing, when teeth have the described above shape in sections by a sphere with the center in the point of gearwheel axes intersection. That is, operating flanks of each tooth of the first gearwheels are outlined in this spherical cross-section by arcs of eccentrically shifted circumferences, and the second profile tooth flank is outlined in the same spherical cross-section by segments of cycloidal curves, conjugated with the gearwheel teeth. Or, in other words, tooth profiles in the principal cross-section of the gearing are represented by arcs of eccentric circumferences, plotted on the sphere, and by segments of spherical cycloidal curves.

If the radius of the eccentric circumference, generating the first gearwheel teeth, is greater than its eccentricity, then the gearwheel body is generated by intersection of these circumferences. If the eccentric shift of the circumference becomes greater than its radius, then the gearwheel body is the cylinder of a certain radius, its value being chosen according to the required load carrying capacity of the gearwheel. In this case, the tips of helical teeth within the second gearwheel profile, generated by segments of cycloidal curves, must be cut to the value, providing the non-intersection of teeth with the gearwheel body.

BRIEF DESCRIPTION OF THE DRAWINGS

The invention is illustrated by graphical information.

DETAILED DESCRIPTION OF THE PREFERRED EMBODIMENTS

Figures do not show the versions of the internal engagement of cylindrical gearwheels and the rack gearing, which can also be implemented according to the proposed invention.

The internal engagement differs from the extern alone only by the teeth of a cycloidal profile generated on the internal cylindrical surface. The rack gearing is the particular case of the cylindrical engagement, when the radius of a greater gearwheel becomes infinitely large.

Figure 1:
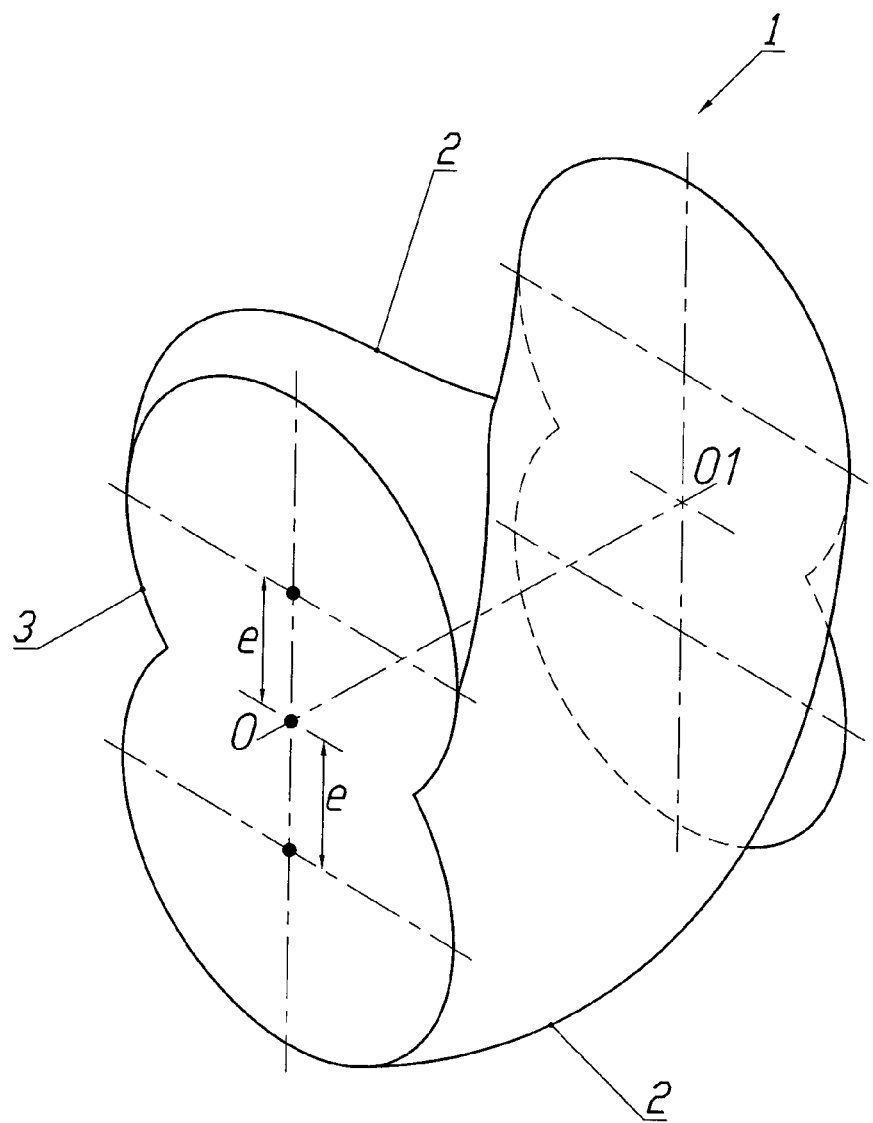
FIG. 1 shows the general view of a cylindrical gearwheel with two helical eccentric teeth, the eccentricity e of the circumference which generates the teeth, being less than its radius.
Figure 2:
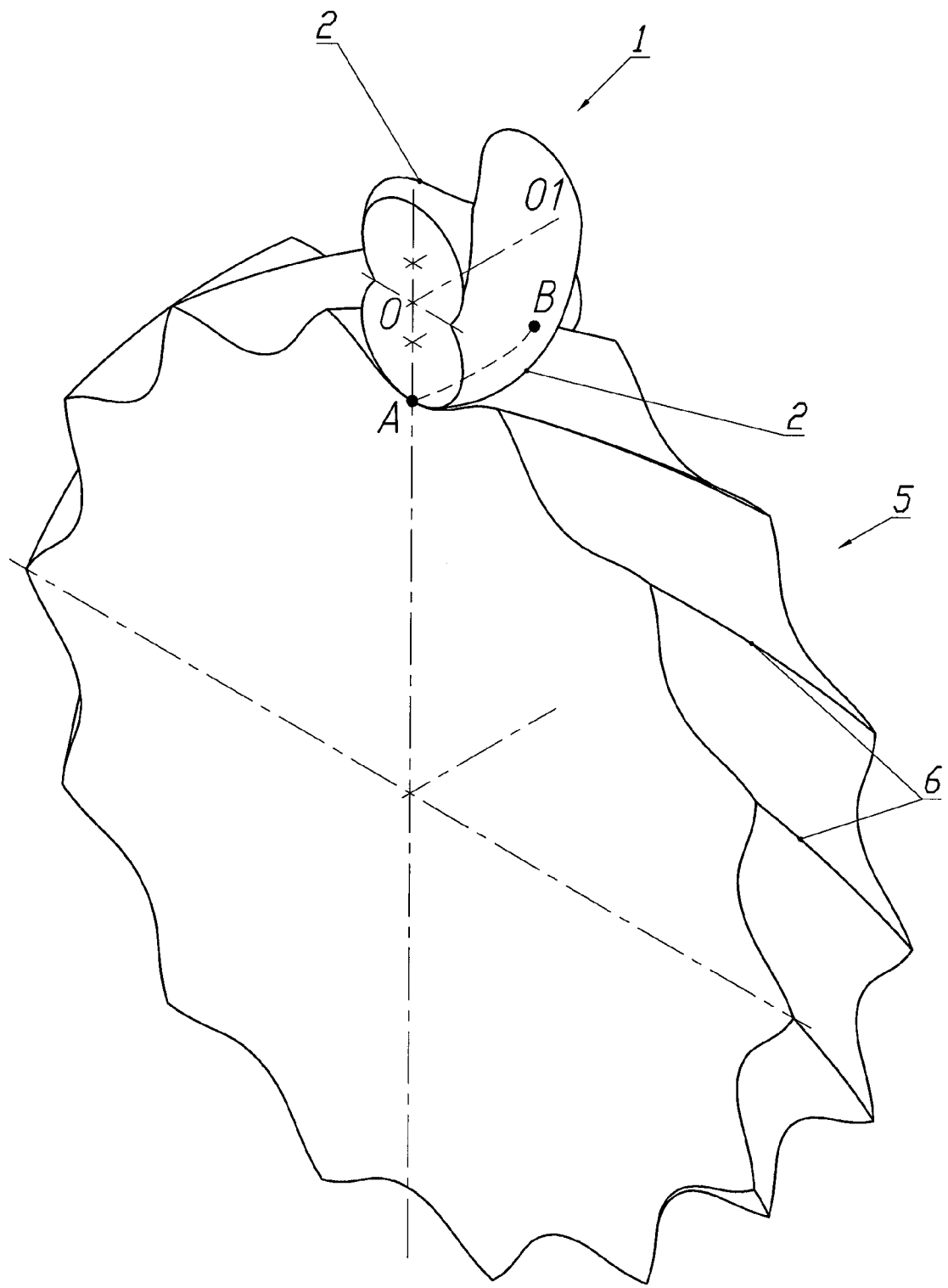
FIG. 2 shows the general view of the external engagement, generated by this gearwheel.
Figure 3:
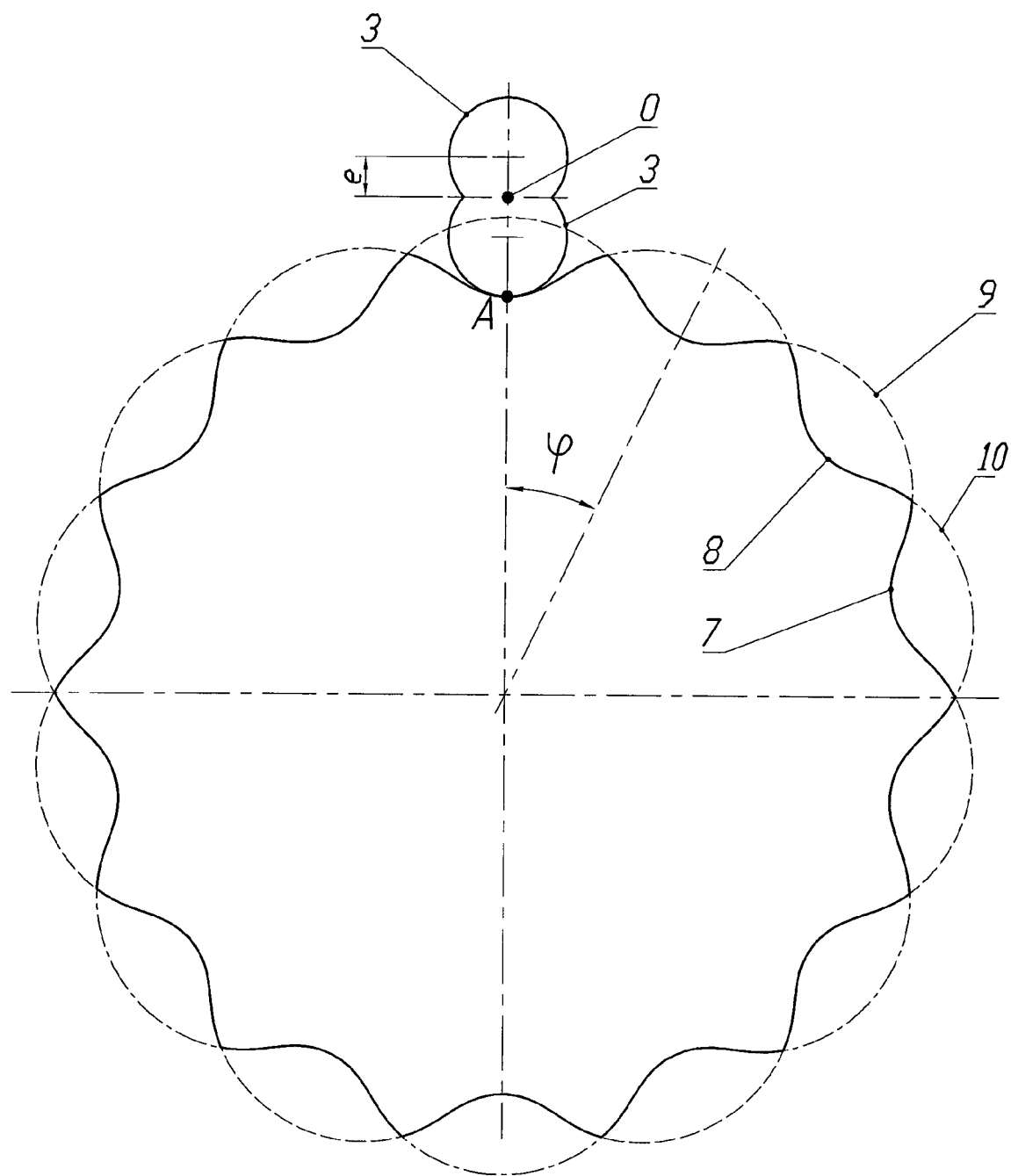
FIG. 3 demonstrates the end section of this gearing.

Let us consider the gearing with toothed profiles, shown in FIGS. 1, 2 and 3. One of the profiles represents the gearwheel 1 with two helical teeth 2. In any principal cross-section, which is the end section for cylindrical gearwheels, each tooth is outlined by the circumference 3, eccentrically shifted with respect to the axis of the gearwheel rotation OO1 by the value e. Helical teeth 2 of the gearwheel 1 are generated by a continuous rotation of these circumferences with respect to the axis OO1 with their simultaneous continuous shifting along this axis. The gear wheel body is generated by intersection of these two helical eccentrics. In comparison with the prototype (a single toothed helical eccentric) and similarly to the worm gear, one can say that the teeth of this gearwheel represent the double-thread helical eccentric. The second toothed profile in the engagement represents the gearwheel 5 with helical teeth 6. Teeth 6 are outlined in end sections by segments 7 and 8 of cycloidal curves 9 and 10, conjugated with the gearwheel 1 teeth. Cycloidal curves 9 and 10 represent the equidistant line of one and the same cycloid, but rotated with respect to each other by the angle, equal to the angular pitch of the cycloid, divided by the tooth number of the smaller gearwheel 1. In this case the angular pitch is equal to 360/7 degrees, and curves 9 and 10 are shifted with respect to each other by the angle $\phi=360/7/2\approx25.7$ degrees.

According to the condition of helical teeth 2 and 6 generation, they will have a contact point, forming a continuous contact line AB along the helical tooth, in each end section. It should be noted here, that exactly a continuous contact line in the ideal theoretical gearing is the fundamental difference of the proposed gearing from Novikov gearing, where profiles have the only contact point theoretically. Our investigations showed, that when the proposed gearing is actually manufactured with deviations of the center distance from the design one, the contact line turns into the contact point, which is transmitted in operation along the straight line, parallel to the gearwheel axis. And depending upon the deviation value of the center distance from the design one, this line is transmitted along the height of a cycloidal tooth by a relatively small value. As a result, the proposed gearing has even smaller dependence on inaccuracies of the center distance than the involute one, since the tooth height in the proposed gearing is greater. In comparison with the prototype (a single toothed eccentrically cycloidal gearing), as for the same inclination angle of the helical tooth, the proposed gearing will have twice smaller length and, therefore, twice less axial dimensions of the gear. Actually, the uniform and continuous operation specifies the axial overlap angle in the prototype greater than 180 degrees. As for the described gearing, this angle will be smaller by a factor of the tooth number of the gearwheel with helical eccentric teeth. The axial length of the gear for the engagement with two teeth (FIGS. 1, 2 and 3) will be two times less than for the prototype. But in order to achieve the same gear ratio here, it will be necessary to double the number of the second profile cycloidal teeth, thus increasing the gear radial dimensions to some extent.

Figure 4:
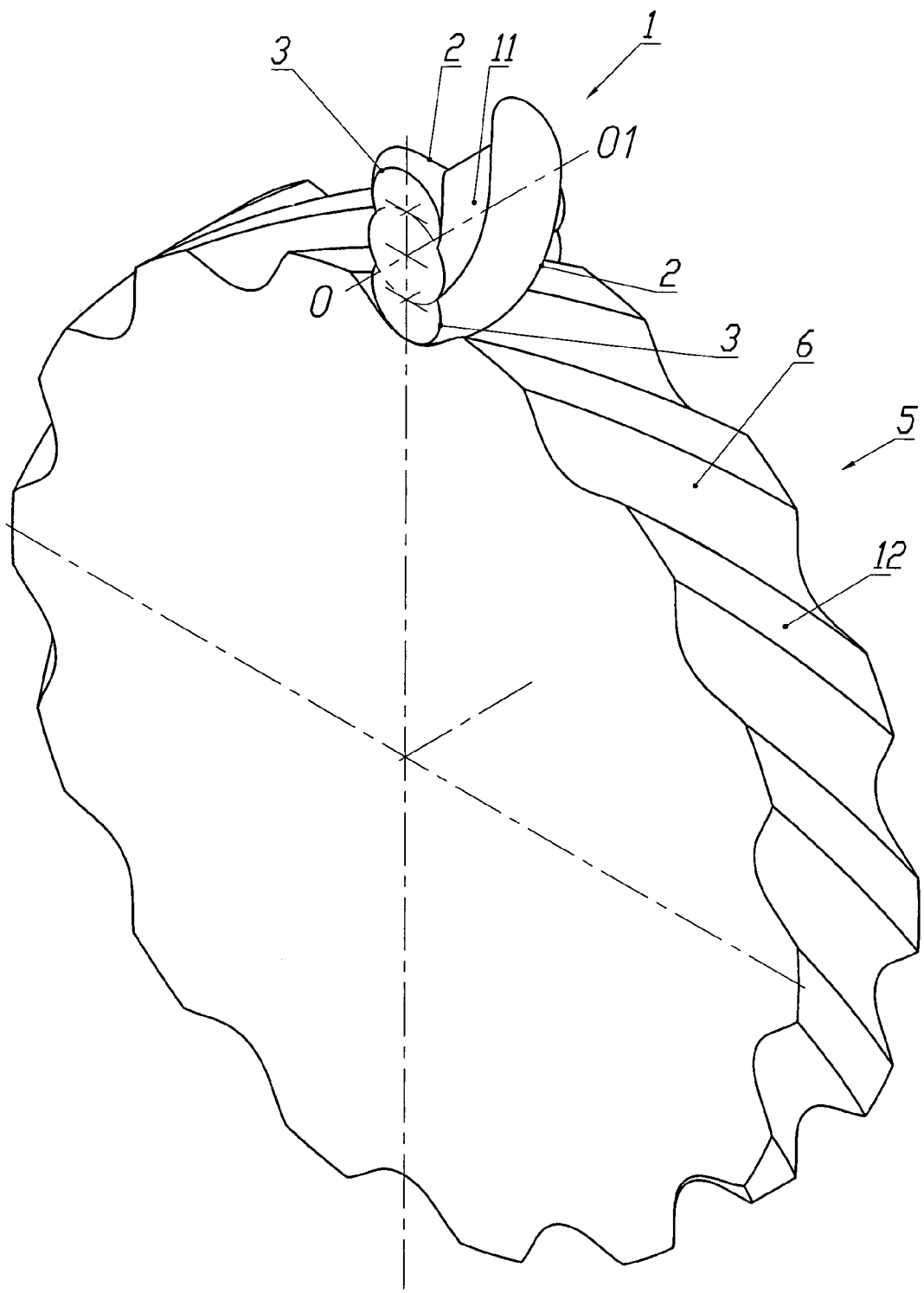
FIGS. 4 and 5 show the general view and the end section of the external cylindrical engagement of a double-teeth gearwheel with helical eccentric teeth, and the circumferences, generating these teeth, have the eccentricity, equal to its radius.
Figure 5:
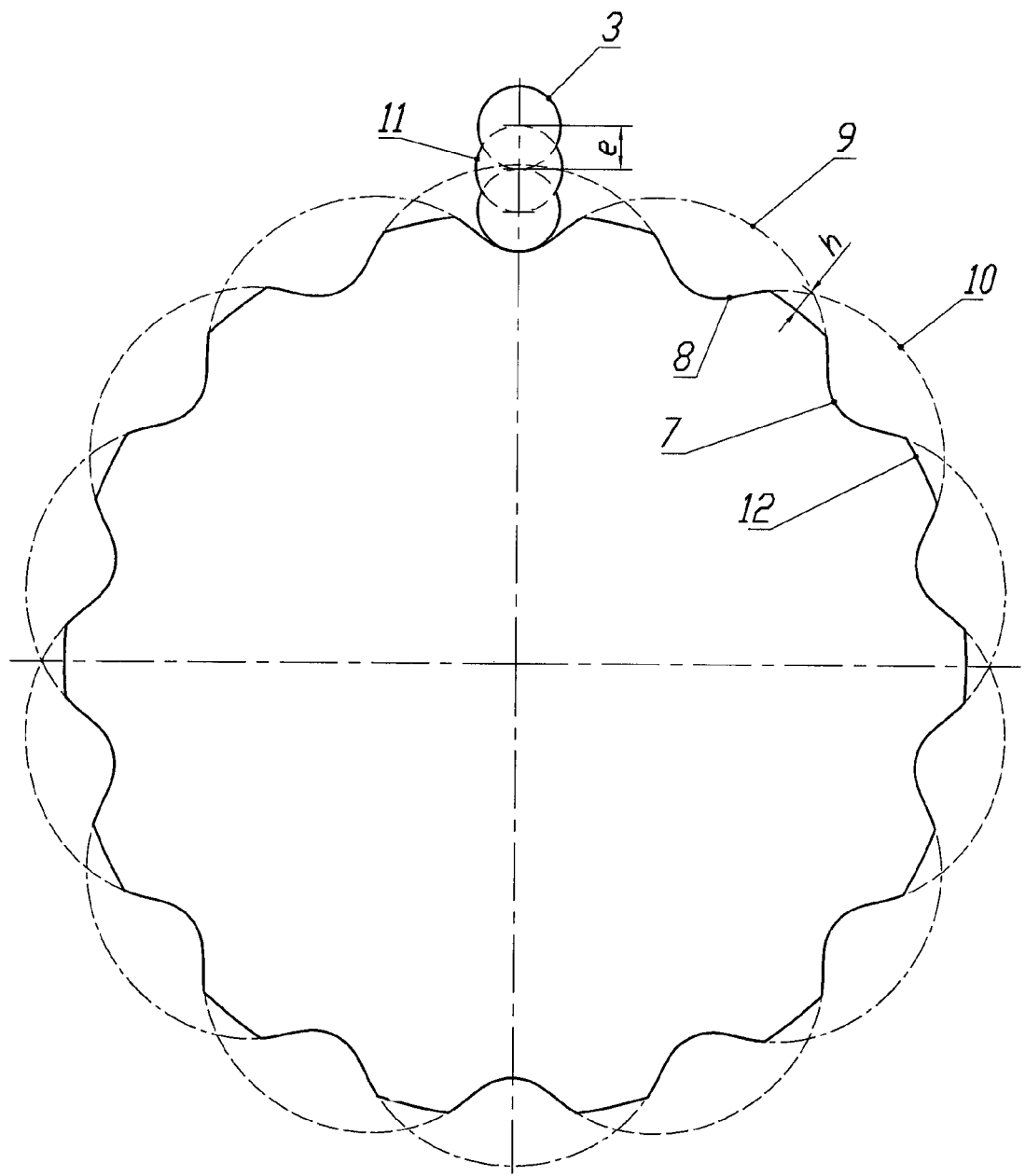

Let us turn to FIGS. 4 and 5 now, where the gearing is shown with the eccentricity e of the circumference 3, generating the gearwheel 1 teeth, equal to the radius of this circumference. In this case the gearwheel body is the cylindrical surface 11, its radius being chosen according to the strength requirements. The radius of the cylindrical surface 11 in Figs. is chosen to be equal to the radius of the eccentric circumference 3, generating the first profile teeth. Helical teeth 6 of the second profile 5 are also generated by segments 7 and 8 of two cycloidal curves 9 and 10. However, in order to avoid the intersection with the surface of the cylinder 11, generating the gearwheel 1 body, tips of each helical cycloidal tooth 6 are cut off, forming the helical segments 12 of a cylindrical surface. The height h of the cut-off is chosen to avoid the intersection of the tooth profile with the cylindrical surface 11 of the gearwheel 1 body within the gearing operation.

Figure 6:
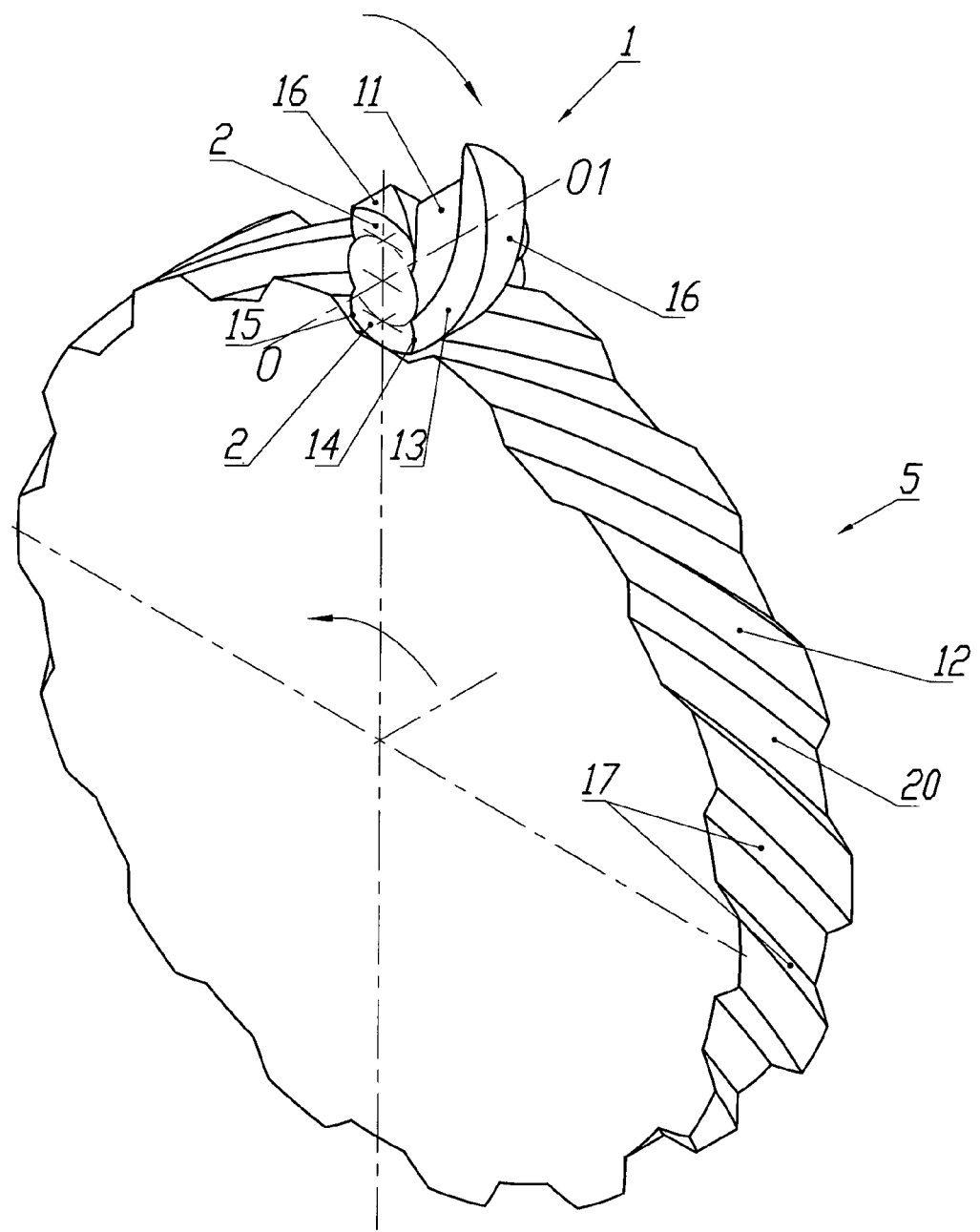
FIGS. 6 and 7 show the similar gearwheels engagement, where only operating segments of tooth flanks have the shape, determined according to the invention.
Figure 7:
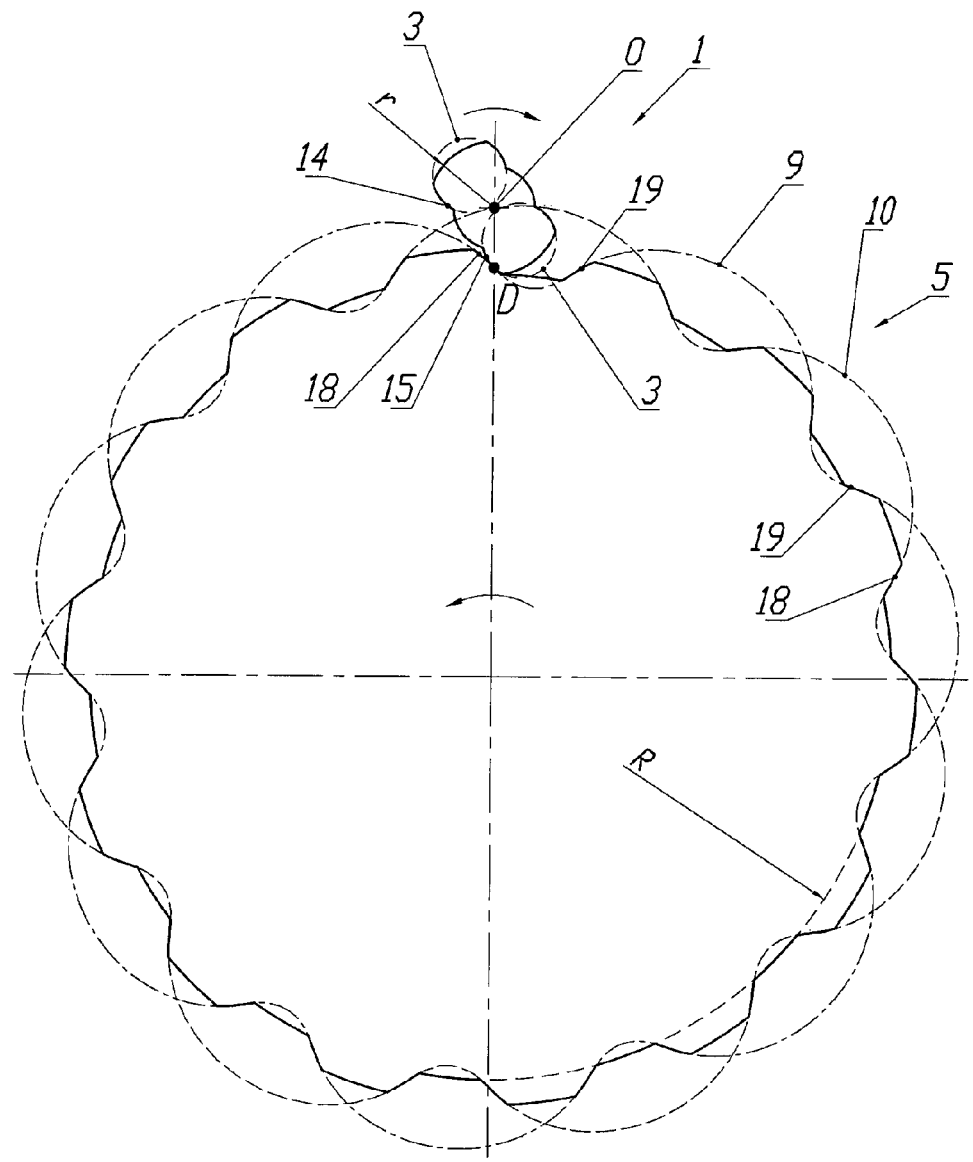

As the computer-aided mathematic simulation of the proposed gearing showed, the force contact in the gearing occurs only at the segments of the front edges of a cycloidal curve. Here, the variation of the gearwheels center distance within the limits, regulated by a standard GOST for the involute gearing, slightly influences the position of the contact point at the segment of this front edge. The contact line is transmitted along the tooth height by several percents only with respect to its length. The conclusion was made here, that the remaining segments of gearwheels profiles can have any shape, non-intersecting with each other. This fact allows to simplify and cheapen significantly the technique of gearwheels manufacturing, since only small areas must be precisely machined. The version of such a gearing is shown in FIGS. 6 and 7. The gearwheel 1 of the first profile has two helical teeth 2. Operating flank segments 13 of each of these teeth are outlined in the end section by arcs 14 and 15 of the eccentric circumference 3. The arcs of these circumferences, mostly remote from the center of the gearwheel rotation, are cut off to form the helical segments 16 in spatial helical teeth, these segments having the shape of a cylindrical surface with the radius r. As in the previous case, the gearwheel 1 body is generated by a cylindrical surface 11.

The gearwheel 5 of the second profile has helical teeth with their operating flank segments 17 outlined by front edges 18 and 19 of cycloidal curves 9 and 10. Troughs between teeth represent helical segments 20 of a cylindrical surface with the radius R. Radii R and r are chosen so, that their sum would be less than the gearwheels center distance. In this case no intersection of profiles will take place. As in the previous version, in order to avoid the tooth intersection with the gearwheel 1 body, tips of cycloidal teeth are also cut off, generating the helical segments of a cylindrical surface 12. As a result of such a profile modification, only operating segments 13 of the gearwheel 1 teeth and segments 17 of the gearwheel 5 need to be precisely machined and finished. It should be noted here, that tips and troughs surfaces of teeth of conjugated profiles can have any shape, non-intersecting with each other. In particular, they can be the surfaces, generated by eccentric circumferences, for the gearwheel 1 and cycloidal curves for the gearwheel 5. That is, in principal cross-sections the profiles of conjugated teeth are fully outlined by eccentric circumferences and segments of intersecting cycloidal curves.

Figure 8:
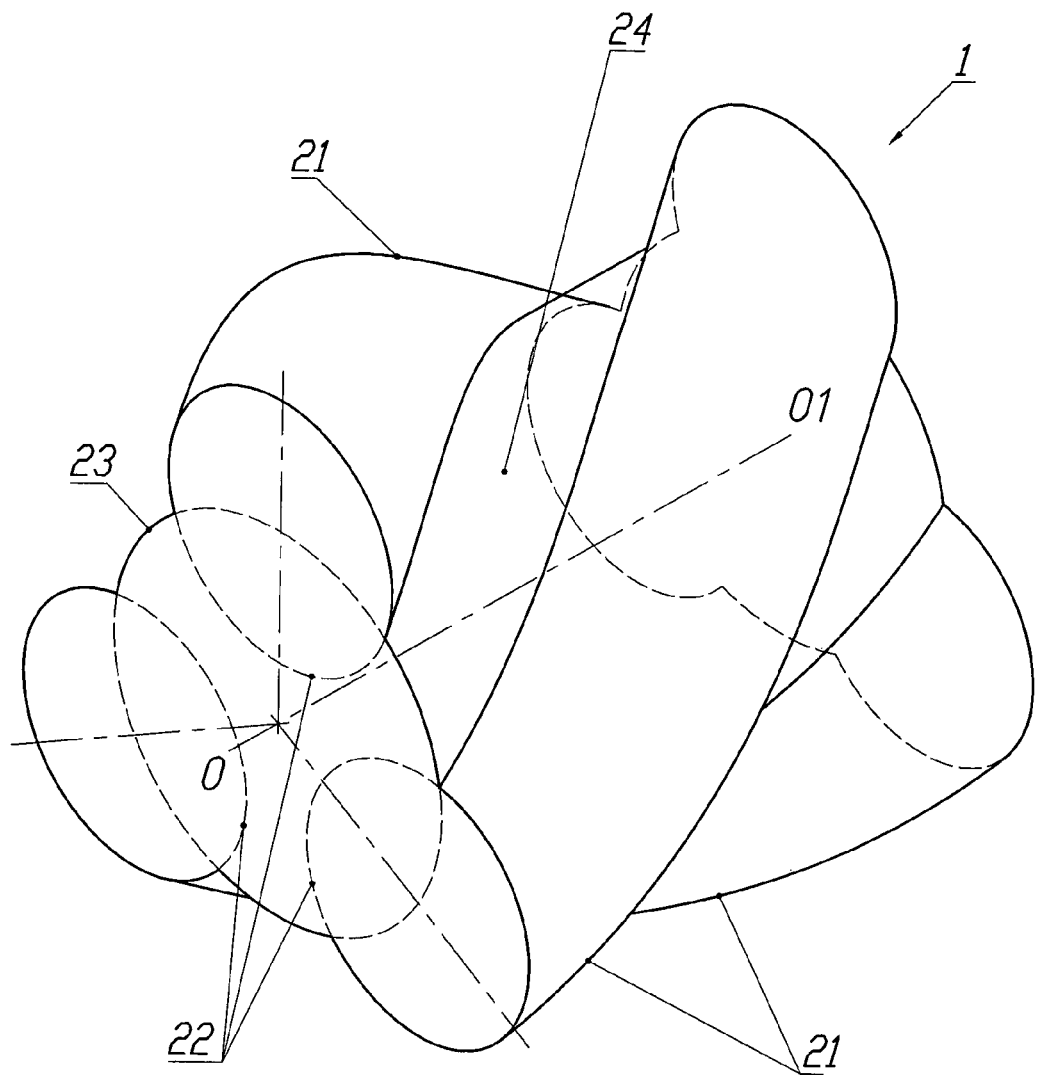
FIG. 8 presents the general view of a cylindrical gearwheel with three eccentric teeth.
Figure 9:
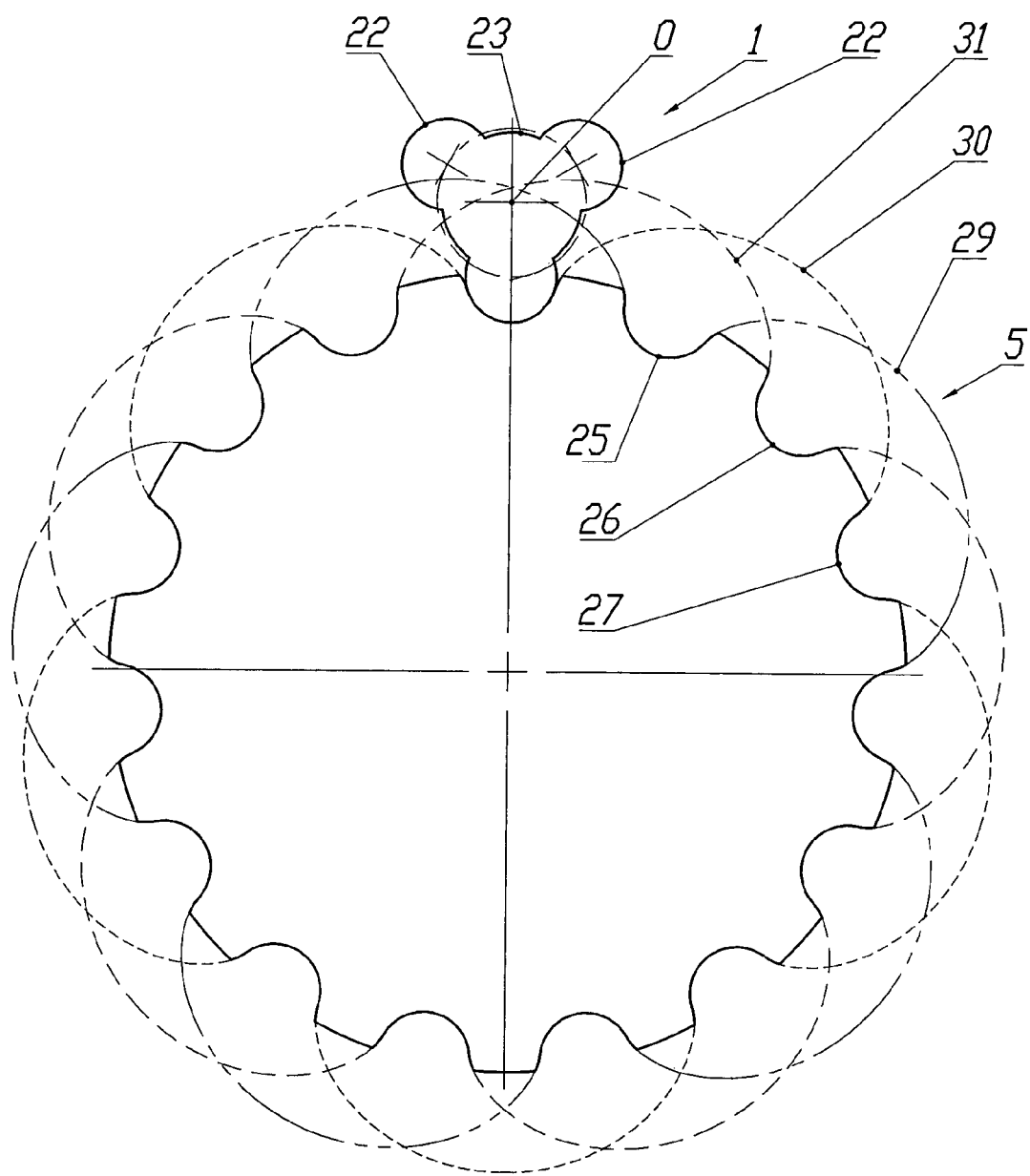
FIG. 9 shows the external gearing end section, generated by this gearwheel.

Let us turn now to the gearing, where the first profile gearwheel 1 has three helical teeth 21 (see FIGS. 8 and 9). These teeth are outlined in the end section of the gearwheel by three circumferences 22, eccentrically shifted from the axis of the gearwheel rotation. The version is shown in Figs, when the eccentricity of circumferences 22 is greater than their radius. In the end section the circumferences are connected by arcs of the circumference 23, generating the cylindrical body 24 of the gearwheel 1. The radius of this cylinder 24 is chosen according to the gearwheel 1 strength conditions.

The second engaging profile represents the gearwheel 5. Its helical teeth are outlined in the end section by segments 25, 26 and 27 of cycloidal curves 29, 30 and 31 correspondingly. The curves 29-31 represent in their essence the equidistant line of one and the same cycloid, shifted by the phase angles, equal to the angular pitch of the cycloid, divided by the tooth number of the eccentric gearwheel 1. Tips of cycloidal teeth are cut off by the value, providing the non-intersection with the body 24 of the gearwheel 1.

Figure 10:
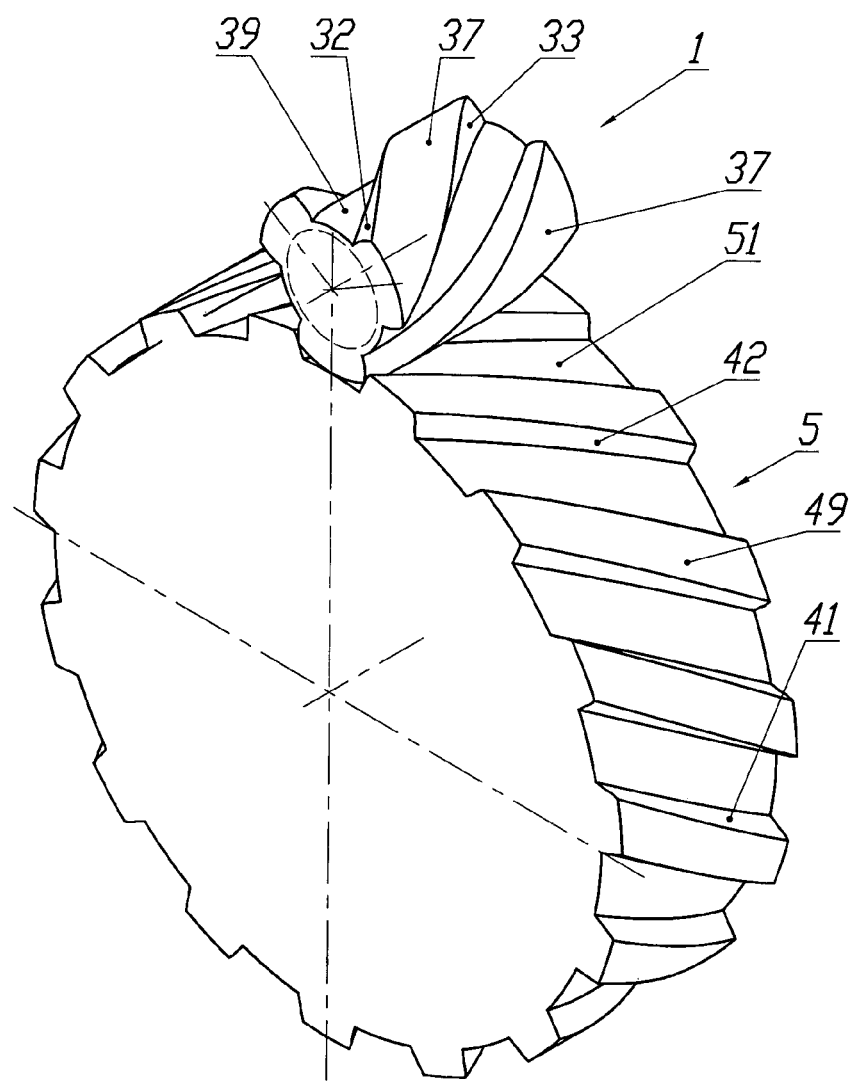
FIG. 10 shows the general view of engagement of the cylindrical gearwheel with three teeth, where only operating segments of tooth flanks have the shape of eccentrically shifted circumferences, and tips and troughs are generated by cylindrical surfaces of various radii, having axes, coinciding with the axis of the gearwheel rotation.
Figure 11:
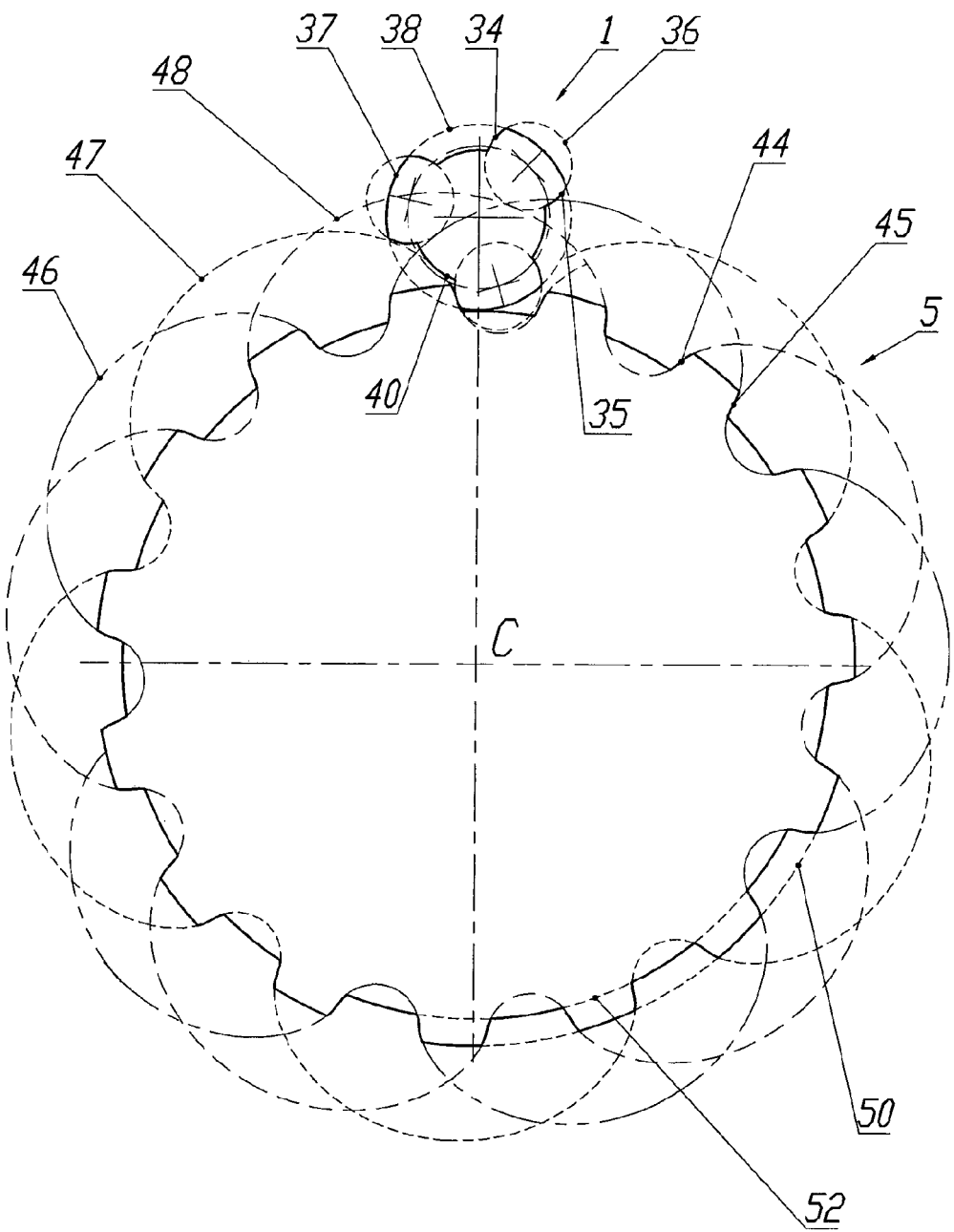
FIG. 11 shows the end section of the external engagement with this gear wheel.

As for the gearing, shown in FIGS. 10 and 11, the first profile gearwheel 1 also has three helical teeth. Unlike the gearing at the previous Figs, teeth of this gearing are modified as follows. Operating flanks 32 and 33 of each tooth in the principal cross-section (which is the end section in this engagement of cylindrical gearwheels) are outlined by arcs 34 and 35 of circumferences 36, eccentrically shifted with respect to the axis of the gearwheel 1 rotation. Tooth tips 37 have the shape of helical segments of a cylindrical surface, represented by the circumference 38 in the end section. Troughs between teeth also represent the helical segments 39 of the cylindrical surface, represented by the circumference 40 in the end section.

The gearwheel 5 has helical teeth with the helical operating flanks 41 and 42 outlined in the end section by segments of the front edges 44 and 45 of cycloidal curves 46, 47 and 48. These curves are equidistant lines of cycloids, rotated with respect to each other by the angle, equal to the angular pitch of the gearwheel 5, divided by the tooth number of the gearwheel 1. In this case this angle constitutes approximately 5.71 degrees. The tips of the gearwheel 5 teeth are helical segments 49 of the cylindrical surface, represented by the circumference 50 in the end section. Correspondingly, troughs between teeth represent the helical segments 51 of the cylindrical surface, represented by the circumference 52 in the end section. It should be noted here, that similarly to the double-teeth gearing in FIGS. 6 and 7, tips and troughs surfaces of conjugated profiles teeth can have any shape, non-intersecting with each other. In particular, it can be surfaces, generated by eccentric circumferences for the gearwheel 1 and cycloidal curves for the gearwheel 5.

Figure 12:
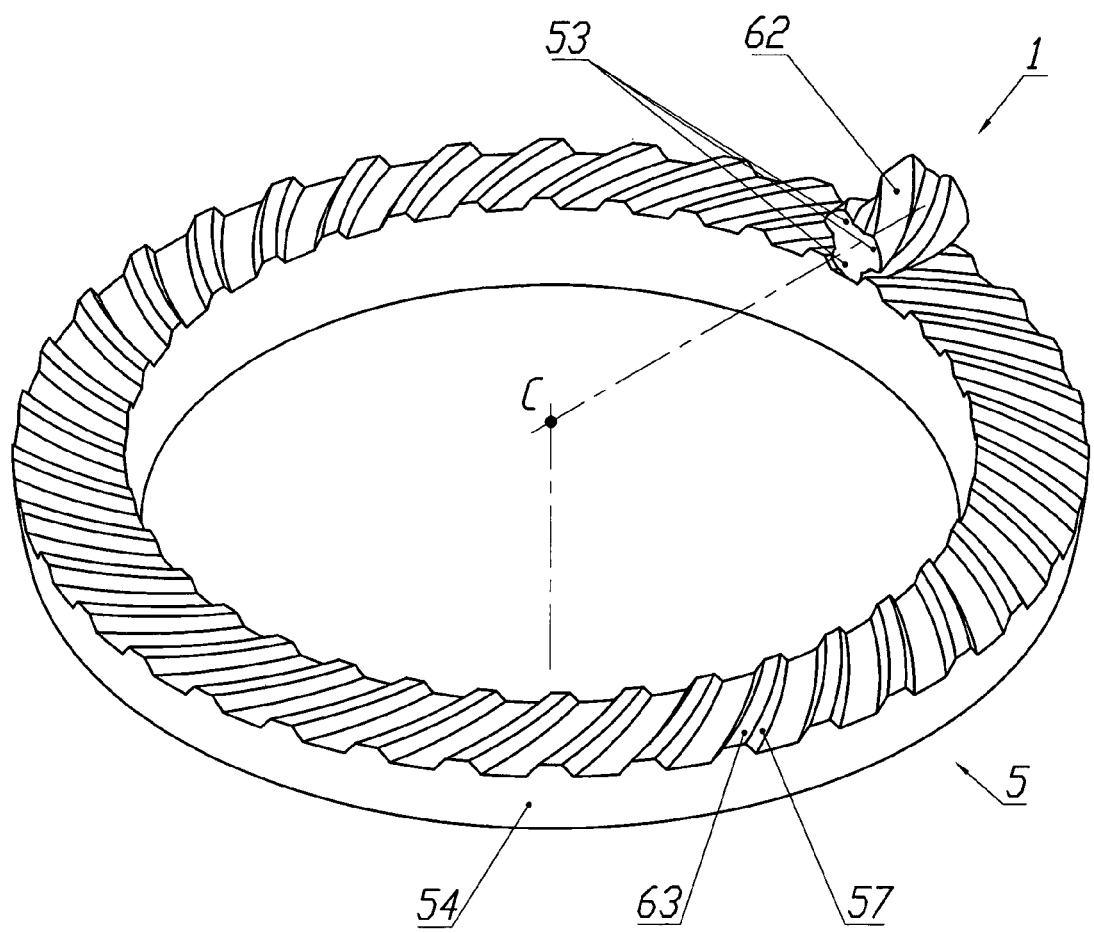
FIG. 12 represents the general view of the proposed engagement of bevel gearwheels.
Figure 13:
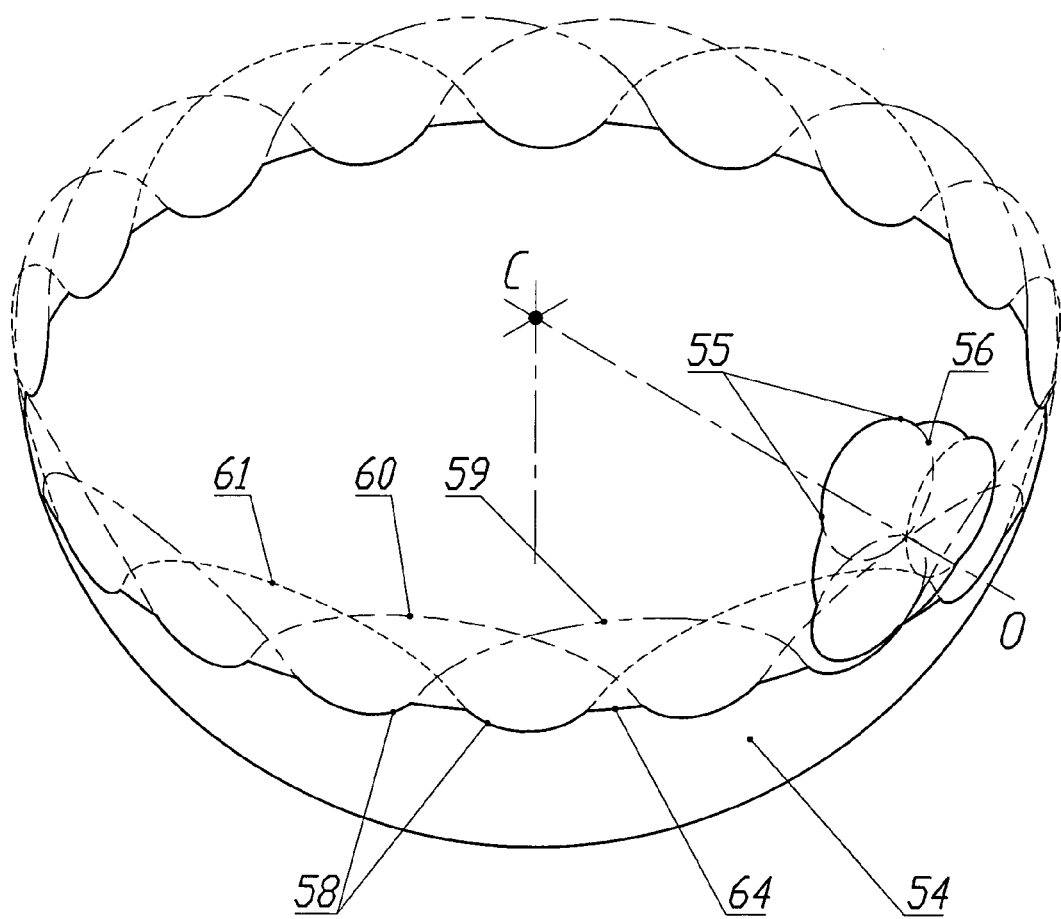
FIG. 13 shows the scheme of tooth profile generation of bevel gearwheels in a spherical section of the engagement.

Let us consider now the versions of bevel gearwheels engagement. In one of the versions, the engaging profiles are generated in a way, similar to the described above for cylindrical gearwheels, but the principal cross-section in this case will be the section by the additional cone. Exactly in this section tooth profiles of one gearwheel are outlined by arcs of eccentric circumferences and tooth profiles of the other gearwheel are outlined by segments of cycloidal curves. Similarly to the involute gearing, such a gearing can be named quasi-EC bevel gearing (see A. F. Kraynev. Reference dictionary on mechanisms, Moscow, Mashinostroyeniye, 1987, p. 166). This gearing version is not shown in Figs, since its plotting slightly differs from plotting the cylindrical gearwheel profiles. For a more stringent plotting the bevel gearwheel tooth profiles, the corresponding profiles must be drawn in the section of gearwheels by a spherical surface, as it is shown in FIGS. 12 and 13 (Spherical EC-gearing).

Here the bevel gearwheel 1 has three helical teeth 53. Profiles of each tooth are generated as follows. A spherical surface 54 is drawn with the center C in the intersection point of bevel gearwheels 1 and 5 axes. In any section of the gearwheel 1 by such a sphere, the operating flanks of tooth profiles are outlined by arcs 55 of circumferences 56, eccentrically shifted from the axis of the gearwheel 1 rotation. Helical teeth of the gearwheel 5 have operating flanks 57, when cross-sectioning by any of the similar spheres, they are outlined by segments of the front edges of cycloidal curves 59, 60 and 61, lying on this sphere, in particular, on the sphere 54. Tooth tips of gearwheels 1 and 5 can be cut off, generating the helical surfaces 62 and 63, as it is shown in FIG. 12. These surfaces are outlined in spherical sections by arcs 64 of concentric circumferences, lying on the sphere 54. One should note, that FIG. 13 shows the scheme of bevel gearwheels profiles generation with the cut off tips of the cycloidal teeth only, wherein FIG. 12 shows the bevel gearing with the cut off tooth tips of both profiles. As it was noted above, the tooth shape at segments outside the operating flank, that is, the shape of the tooth tip and trough, does not matter and it can be arbitrary.

Let us consider the operation of the proposed engagement by the example of the cylindrical gearing, shown in FIGS. 6 and 7. One of helical teeth of the gearwheel 1 has the point D of contacting with the helical profile of the gearwheel 5, the point being shown in the end section of gearwheels. Let the gearwheel 1 rotate around the axis OO1, for instance, clockwise. When the gearwheel 1 is rotating, the interacting operating flanks 15 and 18 of tooth profiles will cause the rotation of the gearwheel 5 counterclockwise. Further, profile teeth will come out of the engagement in the section, shown in FIG. 7, but the point of profiles contact will move to the following section, when the rotation will be transmitted. After the gearwheel 1 is rotated by a half of full revolution, the first tooth of the gearwheel 1 will come out of the engagement and the second tooth will enter the engagement with that tooth of the gearwheel 5. That is, the axial overlap angle can be made two times less, than for the gearwheel with one tooth. When the gearwheel 1 is rotated by one full revolution, the gearwheel 5 will be rotated by the angle, equal to 360°/(Z5/Z1), where Z5 and Z1 are tooth numbers of gearwheels 5 and 1 correspondingly. The gear ratio will be determined as Z5/Z1, and for this gearing it will constitute Z5/2. As for the real gearing, that is, the gearing with deviations of the center distance from the design one, the contact point of gearwheels 1 and 5 profiles will always exist, it can only be shifted along the tooth height and according to the position along the gearwheel axis.

All the described above relates equally to operation of other gearing versions. In case of a rack gearing, the second profile will not be rotating, but linearly transmitting at a linear velocity, determined by the velocity of the gearwheel rotation and the gear ratio.

What is claimed is:

1. An eccentrically cycloidal gear engagement of tooth profiles having curvilinear teeth, comprising:
   a first tooth profile, representing a gearwheel with at least two helical teeth, wherein each operating flank of each tooth of the first tooth profile is outlined, in a principal cross-section of the gearwheel, by an arc of one corresponding circle eccentrically off-set from a center of rotation of the gearwheel; and
   a second tooth profile conjugated with the first tooth profile, wherein the second tooth profile has helical cycloidal teeth, which are outlined, in said cross-section, by segments of front edges of intersecting cycloidal curves.

2. The eccentrically cycloidal gear engagement of claim 1, wherein the eccentricity of each off-set circle forming the shape of the gearwheel tooth is greater than or equal to a radius of the circle, and wherein tips of the helical cycloidal teeth of the second tooth profile are cut off by a value providing non-intersection of the second tooth profile with a body of the gearwheel.

* * * * *